United States Patent [19]

Boy de la Tour

[11] 4,045,681

[45] Aug. 30, 1977

[54] CARGO TRANSFER LOGIC CIRCUITRY

[75] Inventor: Roger Boy de la Tour, Los Angeles, Calif.

[73] Assignee: McDonnell Douglas Corporation, Long Beach, Calif.

[21] Appl. No.: 643,608

[22] Filed: Dec. 22, 1975

Related U.S. Application Data

[62] Division of Ser. No. 528,170, Nov. 29, 1974, Pat. No. 3,958,165.

[51] Int. Cl.² ............................................. H01H 19/64
[52] U.S. Cl. .................................... 307/113; 315/133; 307/127
[58] Field of Search .............. 307/113, 127, 112, 115, 307/157; 340/176, 248 R, 248 B, 248 C, 251, 252 R, 253 R, 253 A, 253 B, 253 C, 255, 411, 412, 415, 332; 315/82, 83, 130–133, 135, 136

[56] References Cited

U.S. PATENT DOCUMENTS 3,952,229   4/1976   Rekow .................................. 315/135

*Primary Examiner*—Robert K. Schaffer
*Assistant Examiner*—Michael K. Mutter
*Attorney, Agent, or Firm*—Robert E. Cunha; Walter J. Jason; Donald L. Royer

[57] ABSTRACT

A cargo loading and unloading shutoff system is used to control transfer of loads between a cargo aircraft and a loading dock. Control logic means compares commands entered on a control console and the existing conditions in the aircraft and on the dock during a loading or unloading operation. On loading, the logic means shuts off the dock conveyor drive immediately when all loads are transferred to selected aircraft positions and then shuts off the aircraft conveyor drive a predetermined period later. On unloading, the logic means shuts off both the aircraft and dock conveyor drives simultaneously when all loads are transferred to selected dock positions. The logic means also prevents energization of the aircraft and dock conveyor drives when the number of load positions selected in the aircraft is different from the number of load positions selected on the dock.

6 Claims, 9 Drawing Figures

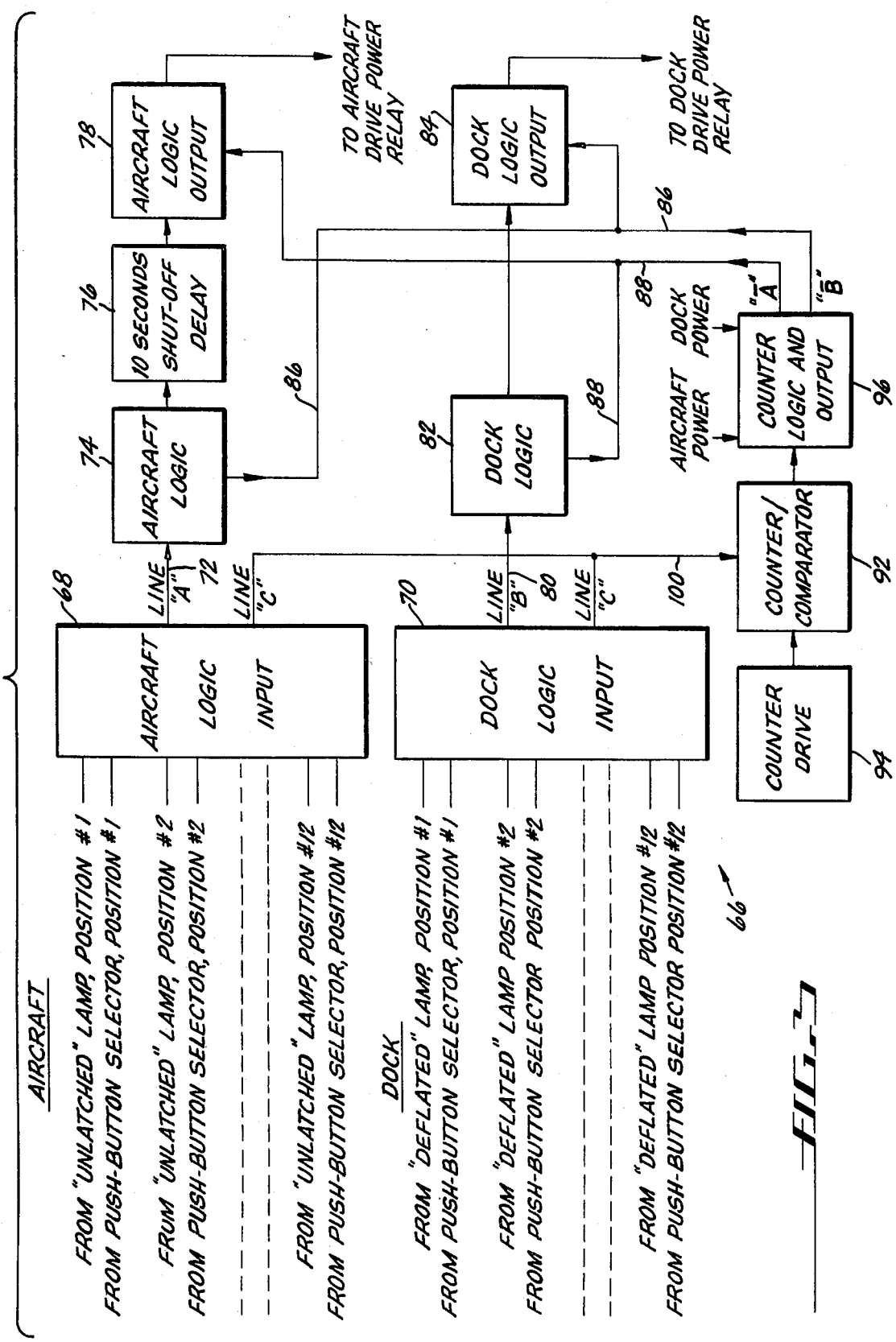

CARGO TRANSFER LOGIC CIRCUITRY

This is a division of application Ser. No. 528,170 filed Nov. 29, 1974, now U.S. Pat. No. 3,958,165.

BACKGROUND OF THE INVENTION

My present invention relates generally to cargo transfer systems. More particularly, the invention relates to a cargo loading and unloading shutoff system for controlling the transfer of loads between a cargo aircraft and a loading dock.

One type of cargo transfer system for transferring loads between an aircraft and a dock comprises an aircraft cargo loading system operating with a similar dock cargo loading system. The aircraft cargo loading system can be like that shown, described and claimed in the U.S. Pat. No. 3,612,316 of Floyd G. Baldwin and Raymond P. Brenner for Cargo Loading and Restraint System patented Oct. 12, 1971, for example, and the dock cargo loading system can be substantially identical thereto. The aircraft cargo loading system involves pertinent latching, locking and unlatching functions, with corresponding monitoring lamps. The dock cargo loading system involves pertinent inflatable bags or tubes functioning as clutches for its conveyor, these clutches being also monitored by lamps.

In the above cargo transfer system, it is possible for an operator to make time-consuming errors and select operations which could result in dangerous situations. Although there are monitoring lamps to indicate the conditions of the various components and the functioning thereof, a large number of lamps with different and varying indications are usually involved. Coupled with other required actions and observations, the monitoring lamps could be more distracting than helpful and may easily lead to errors or failure to notice improper conditions indicated by some of the lamps. Thus, control logic means working with the cargo transfer system and which would eliminate some of the other required actions and observations is desirable and needed to prevent or minimize all such errors and incorrect selections.

SUMMARY OF THE INVENTION

Briefly, and in general terms, my invention is preferably accomplished by providing a cargo loading and unloading shutoff system including control logic means for comparing commands entered on the control console of a cargo transfer system with the existing conditions in an aircraft and on the associated dock during a loading or unloading operation, and appropriately controlling the transfer of loads according to the fulfillment of certain conditions. During a loading operation, the logic means produces a dock drive inhibit signal to shut off the dock conveyor drive immediately when all of the loads are transferred to their selected aircraft positions and latched. At the same time, the logic means also produces another signal which is delayed to shut off the aircraft conveyor drive a short predetermined period after shutoff of the dock conveyor drive.

During an unloading operation, however, the logic means produces an aircraft drive inhibit signal and an undelayed signal to shut off both the aircraft and dock conveyor drives simultaneously when all of the loads are transferred to their selected dock positions and disengaged from the dock conveyor. The logic means further functions to produce an error signal which acts to prevent energization of the aircraft and dock conveyor drives when the number of load positions selected in the aircraft is different from the number of load positions selected on the dock, and also provide an indication for the operator to make a re-selection of such load positions in this event.

BRIEF DESCRIPTION OF THE DRAWINGS

My invention will be more fully understood, and other advantages and features thereof will become apparent, from the following description of an exemplary embodiment of the invention. The description is to be taken in conjunction with the accompanying drawings, in which:

FIG. 3 is a schematic block diagram of an illustrative cargo loading and unloading shutoff system constructed according to this invention;

DESCRIPTION OF THE PRESENT EMBODIMENT

In the following description and accompanying drawings of an exemplary embodiment of my invention, some specific values and types of components are disclosed. It is to be understood, of course, that such values and types of components are given as examples only and are not intended to limit the scope of this invention in any manner.

Figure 1:
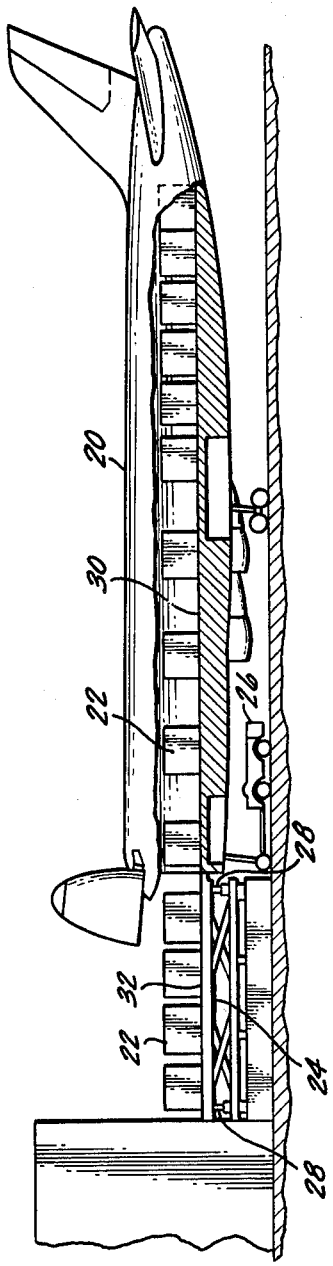
FIG. 1 is an elevational view, shown partly in section and simplified form, of a cargo aircraft being loaded with cargo from a loading dock.

FIG. 1 is an elevational view, shown partly in section and simplified form, of an aircraft 20 being loaded with cargo or loads 22 from a dock 24. The aircraft 20 can be suitably positioned by a towing device 26 against the outer end of the dock 24 which can be vertically adjusted by aligning jacks 28. The aircraft 20 preferably includes a cargo loading system 30 which is similar to that shown, described and claimed in the U.S. Pat. No. 3,612,316 of Floyd G. Baldwin and Raymond P. Brenner for Cargo Loading and Restraint System patented Oct. 12, 1971. Reference can be made to this patent for any details of its system as required. The dock 24 also preferably includes a cargo loading system 32 which is substantially identical to the aircraft cargo loading system 30.

Figure 2:
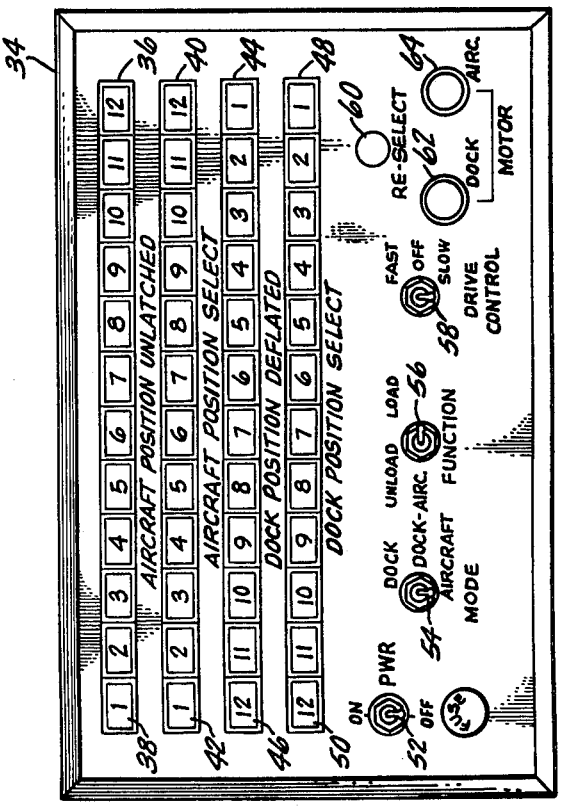
FIG. 2 is a front elevational view of a console control panel including means for selecting and controlling the transfer of cargo between the aircraft dock.

FIG. 2 is a front elevational view of a console control panel 34 for selecting and controlling the loading or unloading of cargo 22 between the aircraft 20 and dock 24. There are, for example, a first row 36 of 12 indicator lamps 38, a second row 40 of 12 push-button switches 42, a third row 44 of 12 indicator lamps 46, and a fourth row 48 of 12 push-button switches 50. The first row 36 is labeled "Aircraft Position Unlatched," the second row 40 is labeled "Aircraft Position Select," the third row 44 is labeled "Dock Position Deflated," and the fourth row 48 is labeled "Dock Position Select." The aircraft positions 1 through 12 correspond to forward to aft positions for cargo pallets or containers in the aircraft 20. The dock positions 1 through 12 correspond to outer to inner positions for cargo pallets or containers on the dock 24.

When an indicator lamp 38 is lit in the first row 36, the corresponding aircraft cargo pallet position is unlatched. The push-button switches 42 in the second row 40 can be of the push-to-close and push-to-open type. When a push-button switch 42 is closed, the corresponding aircraft cargo pallet position is selected. When an indicator lamp 46 in the third row 44 is lit, the inflatable clutch bag or tube (of the nature as described in the U.S. Pat. No. 3,612,316 of Floyd G. Baldwin and Raymond P. Brenner) at the corresponding dock cargo pallet position is energized (clutch engaged at that position). The push-button switches 50 in the fourth row 48 are similar to the push-button switches 42 in the second row 40. When a push-button switch 50 is closed, the corresponding dock cargo pallet position is selected. It may be noted that the number of cargo pallet positions selected in the aircraft 20 should be the same as the number of cargo pallet positions selected on the dock 24.

The console control panel 34 further includes a power on-off switch 52, a three-position mode switch 54, a two-position function switch 56, and a three-position drive control switch 58. The control panel 34 also includes a re-select indicator lamp 60, dock cargo loading drive motor indicator lamp 62, and aircraft cargo loading motor indicator lamp 64. The motor lamps 62 and 64 are lit when the dock and aircraft drive motors (not shown) are energized. To load the aircraft 20 with cargo pallets or loads 22, the power switch 52 is placed in its on position and the dock cargo pallet positions are set in the fourth row 48 by closing the corresponding push-button switches 50. The appropriate aircraft cargo pallet positions to be loaded are set in the second row 40 by closing the corresponding push-button switches 42. If the number of closed aircraft position switches 42 is not the same as the number of closed dock position switches 50, the re-select lamp 60 will be energized to indicate that correction is necessary.

The function switch 56 is then placed in its "load" position. When the selected aircraft position "unlatched" lamps 38 are lit to indicate that their corresponding latches are unlatched, the drive control switch 58 is placed in its "fast" position. The selected cargo pallets are automatically transported to their preselected positions in the aircraft 20 in a manner generally similar or analogous to that illustratively described in the U.S. Pat. No. 3,612,316 of Floyd G. Baldwin and Raymond P. Brenner. As described therein, limit switches in the aircraft 20 sense the presence (latched) or the absence (unlatched) of loads 22 at the different cargo pallet positions in the aircraft. The aircraft unlatched lamps 38 for the selected cargo pallet positions will display the latching of the pallets by becoming unlit as it occurs. When the last cargo pallet reaches its aircraft position and the latch function thereof is displayed, the drive control switch 58 is placed in its off position to complete the loading operation. The unloading sequence of operation is the same as the loading one except that the function switch 56 is placed in its unload position which causes reversal of the aircraft and dock drive mechanisms (conveyors) and energizes the unlatch relay of the aircraft cargo loading system 30. The overall control circuit for the aircraft and dock loading systems 30 and 32 is straight-forward but not pertinent to this invention and need not be further described or shown.

FIG. 3 is a schematic block diagram of an illustrative cargo loading and unloading shutoff system 66 constructed in accordance with my invention. The shutoff system 66 includes aircraft logic input means 68 having input signals obtained froam the aircraft unlatched lamps 38 and select switches 42 (shown in FIG. 2), and dock logic input means 70 having input signals obtained from the dock "deflated" lamps 46 and select switches 50 (also shown in FIG. 2). The output from aircraft input means 68 on lead 72 (A line) is applied to aircraft logic means 74 and through delay means 76 and aircraft logic output means 78 to control the aircraft drive power relay (not shown). The output from dock input means 70 on lead 80 (B-line) is applied to dock logic means 82 and through dock logic output means 84 to control the dock drive power relay (also not shown). A lead 86 from the aircraft logic means 74 to the dock logic output means 84 can provide a dock drive inhibit signal $\overline{B}$ thereto. Similarly, lead 88 from the dock logic means 82 to the aircraft logic output means 78 can provide an aircraft drive inhibit signal $\overline{A}$ thereto.

Lead or bus 100 (C-line) from the aircraft and dock logic input means 68 and 70 to counter/comparator means 92 provides a signal for comparison with a reference signal in the comparator means 92. The comparator means 92 is driven or modulated by drive means 94 which can be a square wave oscillator. The output of the comparator means 92 is applied to counter/comparator logic and re-select output means 96 which can also produce dock and aircraft drive inhibit signals $\overline{B}$ and $\overline{A}$ that are respectively provided to the leads 86 and 88 which are connected to the dock and aircraft logic output means 84 and 78.

On loading, the dock drive mechanism is shut off immediately by the dock drive inhibit signal $\overline{B}$ on lead 86 from the aircraft logic means 74 to the dock logic output means 84 when all unlatched lamps 38 (FIG. 2) corresponding to selected cargo pallet positions in the aircraft 20 are off, indicating that all latches at the selected positions are latched to the cargo pallets or containers. When all of the loads 22 are placed in the aircraft 20 and are latched in the required positions, there is no further need for a dock drive. The aircraft drive mechanism is shut off, for example, 10 seconds later because of the action of the delay means 76 connecting with the output of aircraft logic means 74. Although the loads 22 are latched, they are not yet locked. The locking process takes, for example, 2 to 3 seconds.

On unloading, however, the aircraft and dock drive mechanisms are both shut off simultaneously by the aircraft drive inhibit signal $\overline{A}$ on lead 88 from the dock logic means 82 to the aircraft logic output means 78 controlling the aircraft drive power relay and by the output signal from the dock logic means 82 to the dock logic output means 84 controlling the dock drive power relay. This action occurs when all deflated lamps 46

(FIG. 2) corresponding to selected dock cargo pallet positions on the dock 24 are on, indicating that all clutch bags or tubes at the selected positions are deflated or disengaged. The clutch bags or tubes are stationary in position and are inflated (clutches are engaged) to lift the conveyor against any load 22 so that it can be carried along with movement of the conveyor as described in the U.S. Pat. No. 3,612,316 of Floyd G. Baldwin and Raymond P. Brenner. When a clutch bag or tube is deflated, the conveyor is lowered at that position to disengage it from the load which is not moved further by movement of the conveyor. If all of the selected clutches are disengaged, there is no further need for a drive.

When the number of cargo pallet positions selected in the aircraft 20 is different from the number of cargo pallet positions (loads 22) on the dock 24, the aircraft and dock drive mechanisms will remain inactive. This is accomplished by the dock and aircraft drive inhibit signals $\overline{B}$ and $\overline{A}$ which are respectively provided on the leads 86 and 88 that are connected from comparator logic and re-select output means 96 to the dock and aircraft logic output means 84 and 78. The comparator means 92 in FIG. 3 is essentially a voltage comparator containing a reference voltage which is, for example, half the supply voltage. All loads 22 selected on the dock 24 and set in the dock switches 50 put in the comparator circuit corresponding precision resistances from bus 100 to ground, and all selected positions in the aircraft 20 and set in the aircraft switches 42 connect equal precision resistances from the supply voltage to the bus. When the number of resistances is equal on both sides of bus 100, the bus voltage is equal to the reference voltage and inhibit signals $\overline{B}$ and $\overline{A}$ are not provided from the comparator logic and re-select output means 92 to the leads 86 and 88 which are respectively connected to the dock and aircraft logic output means 84 and 78. Energization of the dock and aircraft drive power relays is, however, prevented when the bus voltage is not equal to the reference voltage.

Figure 4:
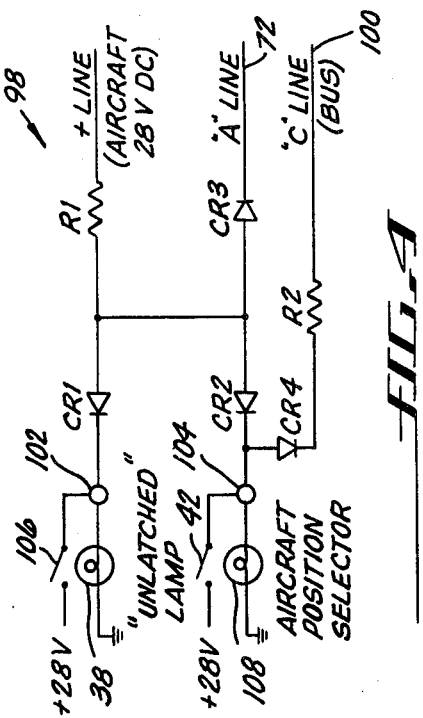
FIG. 4 is a circuit diagram of one of the channel modules used in the aircraft logic input means of the shutoff system.

FIG. 4 is a circuit diagram of an exemplary channel module 98 which can be used in the aircraft logic input means 68 (FIG. 3). Of course, 12 of these channel modules 98 are used in the input means 68 since 12 aircraft cargo pallet positions are illustratively indicated. Each module 98 includes a first diode CR1 connected in series with a first resistor R1 which is connected to the aircraft +28 volts, a second diode CR2 connected in series with a third diode CR3 that is connected to lead 72 (A line), and a fourth diode CR4 connected in series with a second resistor R2 which is connected to lead or bus 100 (C line). The cathode of diode CR1 is connected to a terminal 102 and its anode is connected to the anodes of the diodes CR2 and CR3. The cathode of diode CR2 and the anode of diode CR4 are connected to terminal 104. The resistor R1 has a resistance of 27 kilohms and the resistor R2 has a precision resistance of 14.7 kilohms, for example.

The channel terminal 102 is connected to ground through a corresponding aircraft position unlatched indicator lamp 38 (FIG. 2) and to +28 volts through a corresponding switch 106. This switch 106 can be a limit switch associated with a given or particular aircraft cargo pallet position. The aircraft position switch 106 is closed to energize its related lamp 38 to indicate an unlatched condition at the corresponding aircraft cargo pallet position. The aircraft position switch 106 is opened to de-energize its related lamp 38 to indicate a latched condition at the corresponding aircraft cargo pallet position.

The channel terminal 104 is connected to +28 volts through a corresponding aircraft position select push-button switch 42 (FIG. 2) and to ground through its associated indicator lamp 108. This aircraft select lamp 108. This aircraft select is energized when its related position switch 42 is closed, to indicate that its corresponding aircraft cargo pallet position has been selected to receive a load 22. The indicator lamps 38 and 108 are, for example, of the tungsten filament type which has a very low resistance when off or not lit. Thus, the terminals 102 and 104 are effectively connected to ground when the switches 106 and 42 are open and their associated lamps 38 and 108 are off. It can, therefore, be seen that the voltage on lead 72 (A-line) goes to zero when loading is completed; i.e., when all of the aircraft switches 106 at the selected cargo pallet positions are opened to turn off their associated unlatched lamps 38 and indicate latching of their corresponding loads 22 at those selected aircraft positions.

Figure 5:
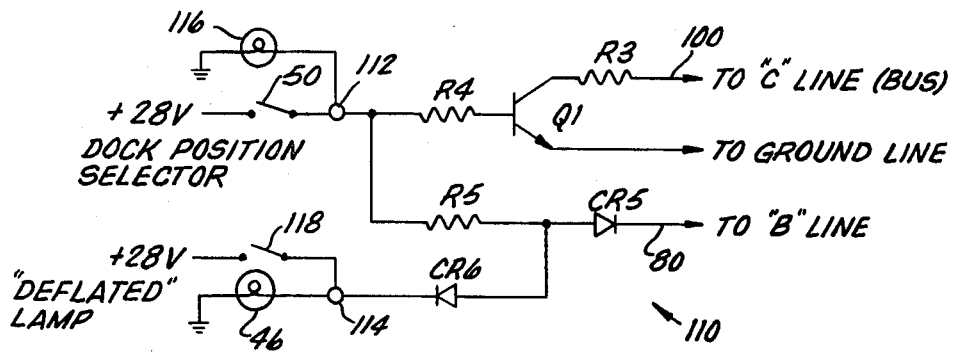
FIG. 5 is a circuit diagram of one of the channel modules used in the dock logic input means of the shutoff system.

FIG. 5 is a circuit diagram of an exemplary channel module 110 which can be used in the dock logic input means 70 (FIG. 3). Of course, 12 of these channel modules 110 are used in the input means 70 since 12 dock cargo pallet positions are at least required to correspond to the 12 aircraft positions. Each module 110 includes a transistor Q1 having its emitter connected to ground, a first resistor R3 connecting the transistor collector to lead or bus 100 (C-line), a second resistor R4 connecting the transistor base to a terminal 112, a first diode CR5 connected to lead 80 (B-line), a third resistor R5 connecting the terminal 112 to the anode of the first diode CR5, and a second diode CR6 connecting the anode of the diode CR5 to another terminal 114. The resistor R3 has a precision resistance of 14.7 kilohms, the resistor R4 has a resistance of 270 kilohms and the resistor R5 has a resistance of 27 kilohms, for example.

The channel terminal 112 is connected to +28 volts through a corresponding dock position select push-button switch 50 (FIG. 2) and to ground through its associated indicator lamp 116. This dock select lamp 116 is energized when its related position switch 50 is closed, to indicate that its corresponding dock cargo pallet position has been selected to receive a load 22. The channel terminal 114 is connected to ground through a corresponding dock position deflated indicator lamp 46 (FIG. 2) and to +28 volts through its associated switch 118. This switch 118 can be a switch which is actuated by a link suitably connected to a latching pawl associated with a given or particular dock cargo pallet position. The dock position switch 118 is closed when its corresponding load is being latched. This closed switch 118 energizes its related lamp 46 to indicate a deflated or clutch disengaged condition at the corresponding dock cargo pallet position.

The indicator lamps 46 and 116 are, for example, of the tungsten filament type which has a very low resistance when off or not lit. Thus, the terminals 112 and 114 are effectively connected to ground when the switches 50 and 118 are open and their associated lamps 116 and 46 are off. When the switch 50 is closed, the transistor Q1 conducts to connect the resistor R3 from lead or bus 100 (C-line) to ground. If the switch 118 is also closed, the anode of the diode CR5 then will not be grounded through the diode CR6 and an off lamp 46. It can, therefore, be seen that the voltage on lead 80 (B-line) goes from zero to positive after an unloading operation is completed; i.e., when all of the dock switches 118 at the selected cargo pallet positions are closed to turn on their associated deflated lamps 46 and indicate clutch disengagement of their corresponding loads 22 at those selected dock positions.

Figure 6:
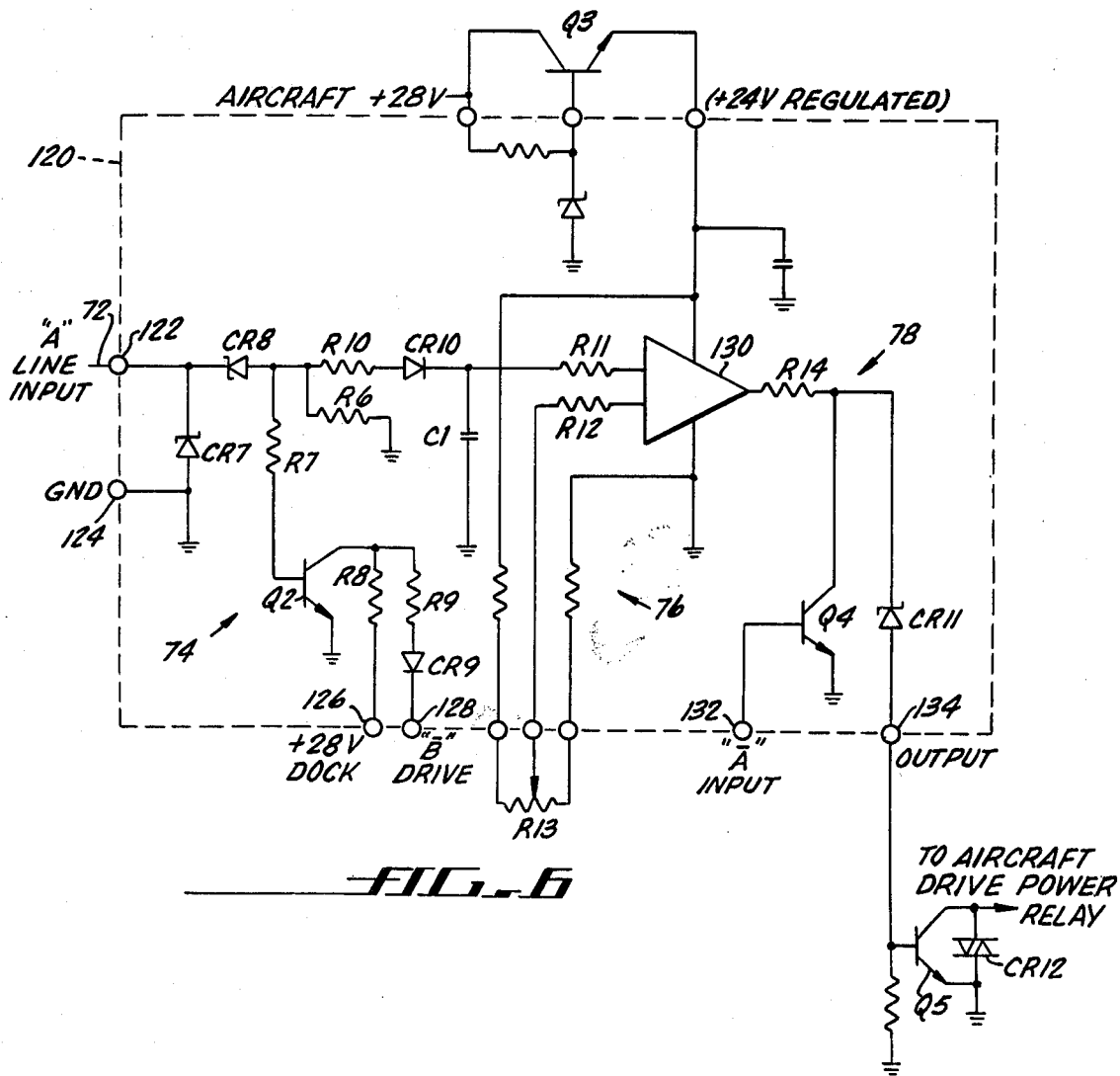
FIG. 6 is a circuit diagram of an exemplary aircraft logic module including aircraft logic means, delay means output means used in the shutoff system.

FIG. 6 is a circuit diagram of an exemplary aircraft logic module 120 including aircraft logic means 74, delay means 76 and aircraft logic output means 78. Lead 72 (A-line) is connected to input terminal 122 which is, in turn, connected to ground terminal 124 through a zener diode CR7 that has a breakdown voltage of, for example, 20 volts. The input terminal 122 is connected through another zener diode CR8 with a breakdown voltage of, for example, 6-volts to a grounded resistor R6. The anode of the zener diode CR8 is connected by resistor R7 to the base of transistor Q2 which has its emitter grounded and its collector connected to dock +28 on terminal 126 through resistor R8. The collector of the transistor Q2 is also connected through resistor R9 and series diode CR9 to terminal 128 which can provide a dock drive inhibit signal $\overline{B}$ therefrom. When the A-line exceeds +6 volts, the transistor Q2 conducts so that there is no dock drive inhibit signal $\overline{B}$ from the terminal 128; however, when the A-line voltage goes below +6 volts (to zero), the transistor is turned off and the positive voltage on terminal 126 is provided to the terminal 128 for the inhibit signal $\overline{B}$ to control the dock drive mechanism.

The anode of the zener diode CR8 is also connected to a grounded capacitor C1 through resistor R10 and series diode CR10. The capacitor C1 is connected by resistor R11 to a first input of comparator amplifier 130 which is supplied with +24 volts regulated by the circuit of transistor Q3. The second input of the amplifier 130 is connected by resistor R12 to the wiper of a potentiometer R13. The wiper of the potentiometer R13 is used to set the delay voltage that the capacitor C1 must reach or drop to before the output of the amplifier 130 flips from negative to positive or vice versa. The output of the amplifier 130 is connected by resistor R14 to the collector of a transistor Q4 having its emitter grounded and base connected to terminal 132. An aircraft drive inhibit signal $\overline{A}$ can be provided on the terminal 132 and, when present, would cause the transistor Q4 to conduct and reduce a positive output from resistor R14 to zero.

The resistor R14 is also connected by a 6-volts breakdown zener diode CR11 to output terminal 134. This terminal 134 is connected by transistor Q5 to the aircraft drive power relay (not shown). A two-diode varistor unit CR12 can be connected between the collector and emitter of the transistor Q5 to absorb the inductive kickback from the power relay. Of course, other absorption means such as a capacitor or suitably oriented diode can be used instead of the varistor unit CR12 between the collector and emitter of the transistor Q5. When a positive signal appears from the diode CR10, the capacitor C1 is promptly charged to produce a positive output signal from the amplifier 130. When, however, the positive signal from diode CR10 is removed as when aircraft loading is completed, the capacitor C1 discharges through the resistor R11 and the first input of the amplifier 130 at a rate such that it takes approximately 10 seconds before the amplifier output signal flips from positive to negative. Of course, the transistor Q2 is turned off when the positive signal from the diode CR10 was removed. Thus, the aircraft drive output signal at terminal 134 is removed after a predetermined delay following the appearance of the dock inhibit signal $\overline{B}$ at terminal 128.

Figure 7:
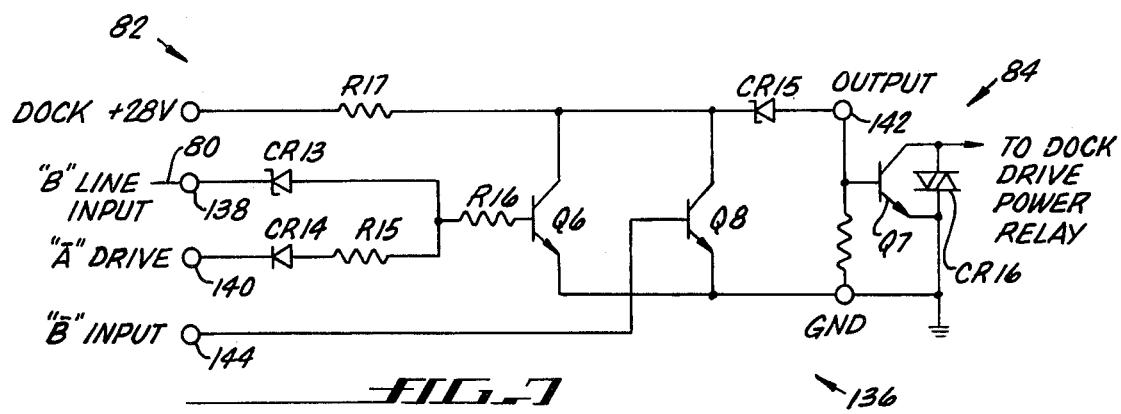
FIG. 7 is a circuit diagram of an exemplary dock logic module including dock logic means and output means used in the shutoff system.

FIG. 7 is a circuit diagram of an exemplary dock logic module 136 including dock logic means 82 and dock logic output means 84. Lead 80 (B-line) is connected to input terminal 138 which is, in turn, connected by a 6-volts breakdown zener diode CR13 to terminal 140 through resistor R15 and series diode CR14. The terminal 140 is connected to terminal 132 (FIG. 6) and the lead 80 goes positive after an unloading operation to provide an aircraft drive inhibit signal $\overline{A}$ on terminals 140 and 132 to remove power from the aircraft drive power relay at such time. The zener diode CR13 is also connected to the base of transistor Q6 through resistor R16. The emitter of the transistor Q6 is grounded and its collector is connected to +28 volts by resistor R17. The collector of the transistor Q6 is connected by a 6-volts breakdown zener diode CR15 to output terminal 142. This terminal 142 is connected by transistor Q7 to the dock drive power relay (not shown). A two-diode varistor CR16 or other means can be connected between the collector and emitter of the transistor Q7 to absorb the inductive kickback from the power relay.

When the lead 80 (B-line) goes positive, the transistor Q6 conducts to turn off the transistor Q7 and remove power from the dock drive power relay. Terminal 144 is connected to the base of transistor Q8 which has its emitter grounded and its collector connected to the collector of the transistor Q6. The terminal 144 is connected to the terminal 128 (FIG. 6). When the dock drive inhibit signal $\overline{B}$ is produced at the terminal 128 and connected to the terminal 144, transistor Q8 conducts to turn off the transistor Q7 and remove power from the dock drive power relay. The dock drive mechanism is thus de-energized when aircraft loading or unloading is completed.

Figure 8:
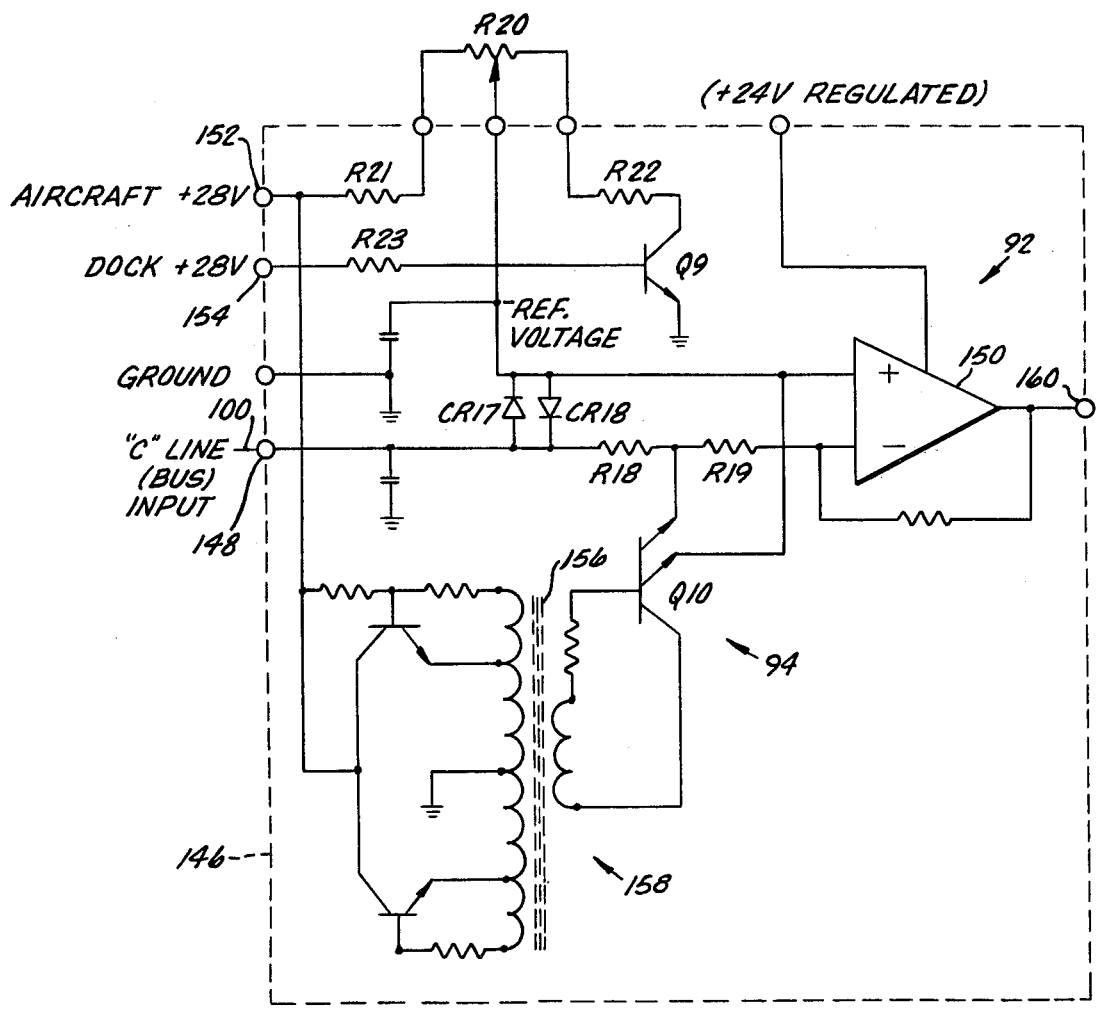
FIG. 8 is a circuit diagram of an exemplary drive and comparator means module including counter/comparator means and drive means used in the shutoff system.

FIG. 8 is a circuit diagram of an exemplary drive and comparator means module 146 including counter/comparator means 92 and drive means 94. Lead or bus 100 (C-line) is connected to input terminal 148 which is connected to the negative or inverting input of comparator amplifier 150 through series resistors R18 and R19. The positive or non-inverting input of the amplifier 150 is connected to the wiper of a potentiometer R20 which provides a reference voltage to the positive input. Diodes CR17 and CR18 are provided as voltage limiters. The amplifier 150 is, for example, an operational amplifier having the usual very high gain to produce a normally saturated output signal. The potentiometer R20 is connected to aircraft +28 volts on terminal 152 through resistor R21, and to ground through resistor R22 and series transistor Q9. The base of the transistor Q9 is connected to dock +28 volts on terminal 154 through resistor R23.

A saturable core transformer 156 is connected in a conventional square wave oscillator 158 having a dual emitter transistor Q10 connected to provide square wave output signals at the positive and negative inputs of the amplifier 150. Thus, modulated input signals are provided to the amplifier 150 which produces a square wave output signal at its output terminal 160 according to any difference between the input signals to the amplifier. When the number of aircraft cargo pallet positions selected by closing the corresponding switches 42 (FIGS. 2 and 4) is equal to the number of dock cargo pallet position switches 50 (FIGS. 2 and 5) likewise selected, the resistances of the precision resistors R2 and R3 are equal on both sides of the lead or bus 100 (C-line)

so that the bus voltage to the negative input of the amplifier 150 is equal to the reference voltage to the positive input thereof. The output signal on terminal 160 is zero when the input signals to the positive and negative inputs of the amplifier 150 are equal.

When, however, the number of aircraft positions selected by closing their corresponding switches 42 is not equal to the number of dock positions selected by closing their corresponding switches 50, the resistances of the precision resistors R2 and R3 on the two sides of the lead or bus 100 (C-line) are unequal so that the bus voltage to the negative input of the amplifier 150 will not be equal to the reference voltage to the positive input thereof. A square wave error signal is then produced at the output terminal 160 of the amplifier 150. A significant change of aircraft and/or dock +28 volts at the terminals 152 and 154 will decrease or increase the reference voltage on the positive input of amplifier 150 and also produce a resultant square wave error signal at the output terminal 160.

Figure 9:
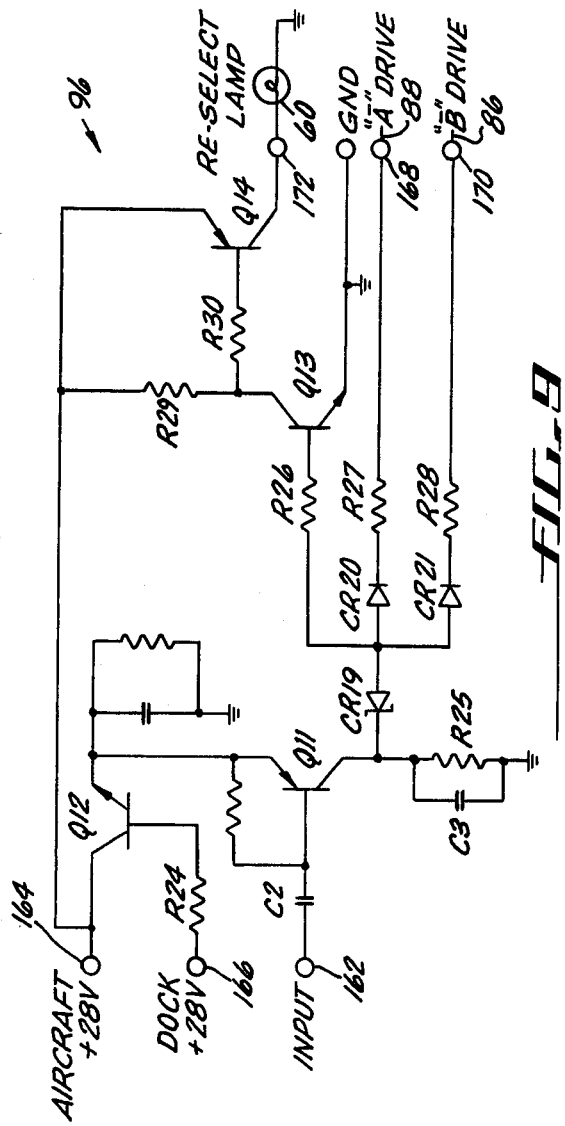
FIG. 9 is a circuit diagram of an exemplary embodiment of the comparator logic and re-select output means used in the shutoff system.

FIG. 9 is a circuit diagram of an exemplary embodiment of the comparator logic and re-select output means 96. The output terminal 160 (FIG. 8) of the amplifier 150 is connected to input terminal 162 which is coupled to the base of a transistor Q11 by capacitor C2. The emitter of transistor Q11 is connected to aircraft +28 volts on terminal 164 through another transistor Q12 which has its base connected through resistor R24 to dock +28 volts on terminal 166. The collector of the transistor Q11 is connected to ground by resistor R25 and parallel capacitor C3. The collector of transistor Q11 is also connected through a 6-volts breakdown zener diode CR19 to the base of transistor Q13 by resistor R26, aircraft drive inhibit output terminal 168 by diode CR20 and series resistor R27, and dock drive inhibit output terminal 170 by diode CR21 and series resistor R28. The emitter of the transistor Q13 is connected to ground, and its collector is connected to aircraft +28 volts by resistor R29 and to the base of transistor Q14 by resistor R30. The emitter of transistor Q14 is connected to the aircraft +28 volts and its collector is connected to output terminal 172 which is connected to ground through re-select indicator lamp 60.

When a square wave error signal from amplifier 150 is provided on the input terminal 162, the transistor Q11 conducts and a positive voltage is applied to the base of transistor Q13 so that it also conducts. This reduces the potential on the base of transistor Q14 such that it conducts and energizes the re-select lamp 60 indicating that re-selection of the aircraft and dock position switches 42 and 50 (FIGS. 2, 4 and 5) should be made. At the same time, an aircraft drive inhibit signal $\overline{A}$ is provided on terminal 168 and a dock drive inhibit signal $\overline{B}$ is provided on terminal 170. The terminal 168 is connected to terminal 132 (FIG. 6) of the aircraft logic output means 78 and the terminal 170 is connected to terminal 144 (FIG. 7) of the dock logic output means 84. Thus, the aircraft and dock drive mechanisms will be deenergized until a proper selection of the aircraft and dock position switches 42 and 50 is made.

While an exemplary embodiment of this invention has been described above and shown in the accompanying drawings, it is to be understood that such embodiment is merely illustrative of, and not restrictive on, the broad invention. In FIG. 4, for example, all of the diodes can be reversed in orientation and negative voltages used instead of positive ones. This can be similarly done in FIG. 5 along with the use of the PNP transistor instead of a NPN one. Obviously, other variations can be correspondingly made elsewhere. Thus, I do not desire to be limited in my invention to the specific arrangements, circuits or structures described and shown, for various modifications thereof may be made without departing from the principles involved in this invention.

I claim:

1. In a cargo transfer shutoff system, vehicle selector and status circuit means comprising:
   first diode means including an anode and a cathode;
   first resistance means of a predetermined value connecting a positive voltage of predetermined value to said first diode anode;
   first lamp means having a very low resistance value when unlit connecting said first diode cathode to ground;
   first switch means connecting said first diode cathode to said positive voltage;
   second diode means including an anode and a cathode, said first diode anode being connected to said second diode anode;
   second lamp means having a very low resistance value when unlit connecting said second diode cathode to ground;
   second switch means connecting said second diode cathode to said positive voltage, said first resistance means being of predetermined value to reduce current passing through it so that said first and second lamp means remain respectively unlit when said first and second switch means are open; and
   third diode means including an anode and a cathode, said second diode anode being connected to said third diode anode and said third diode cathode being connected to an output lead,
   whereby when said second switch means is closed as a selector switch, said output lead is positive to indicate a closed status condition of said first switch means and is zero to indicate an open status condition thereof.

2. The invention as defined in claim 1 wherein a plurality of said vehicle selector and status circuit means are used and said output lead of each of said plurality of circuit means is connected to a common output line, whereby when said second switch means is closed in selected ones of said plurality of circuit means, said output line is positive to indicate a closed status condition of at least one of said first switch means corresponding to said closed second switch means and is zero to indicate an open status condition of all of said first switch means corresponding to said closed second switch means.

3. In a cargo transfer shutoff system, dock selector and status circuit means comprising:
   first diode means including an anode and a cathode, said first diode cathode being connected to an output lead;
   first resistance means of a predetermined value connected on one end to said first diode anode;
   first lamp means having a very low resistance when unlit connecting the other end of said first resistance means to ground;
   first switch means connecting said other end of said first resistance means to a positive voltage of predetermined value;
   second diode means including an anode and a cathode, said first diode anode being connected to said second diode anode;

second lamp means having a very low resistance when unlit connecting said second diode cathode to ground; and second switch means connecting said second diode cathode to said positive voltage, whereby when said first switch means is closed as a selector switch, said output lead is positive to indicate a closed status condition of said second switch means and is zero to indicate an open status condition thereof.

4. The invention as defined in claim 3 wherein a plurality of said dock selector and status circuit means are used and said output lead of each of said plurality of circuit means is connected to a common output line, whereby when said first switch means is closed in selected ones of said plurality of circuit means, said output line is positive to indicate a closed status condition of all of said second switch means corresponding to said closed first switch means and is zero to indicate an open status condition of at least one of said second switch means corresponding to said closed first switch means.

5. In a cargo transfer shutoff system, control means comprising:

at least one vehicle selector and status circuit means including first vehicle diode means comprising an anode and a cathode, first vehicle resistance means of a predetermined value connecting a positive voltage of predetermined value to said first vehicle diode anode.

first vehicle lamp means having a very low resistance value when unlit connecting said first vehicle diode cathode to ground, first vehicle switch means connecting said first vehicle diode cathode to said positive voltage, second vehicle diode means comprising an anode and a cathode, said first vehicle diode anode being connected to said second vehicle diode anode, second vehicle lamp means having a very low resistance value when unlit connecting said second vehicle diode cathode to ground, second vehicle switch means connecting said second vehicle diode cathode to said positive voltage, said first vehicle resistance means being of predetermined value to reduce current passing through it so that said first and second vehicle lamp means remain respectively unlit when said first and second vehicle switch means are open, third vehicle diode means comprising an anode and a cathode, said second vehicle diode anode being connected to said third vehicle diode anode and said third vehicle diode cathode being connected to a vehicle output lead, fourth vehicle diode means comprising an anode and a cathode, said second vehicle diode cathode being connected to said fourth vehicle diode anode, and second vehicle resistance means of a predetermined value connecting said fourth vehicle diode cathode to a vehicle bus lead so that when said second vehicle switch means is closed as a selector switch, said second vehicle resistance means connects said positive voltage to said vehicle bus lead; and at least one dock selector and status circuit means including first dock diode means comprising an anode and a cathode, said first dock diode cathode being connected to a dock output lead, first dock resistance means of a predetermined value connected on one end to said first dock diode anode, first dock lamp means having a very low resistance when unlit connecting the other end of said first dock resistance means to ground, first dock switch means connecting said other end of said first dock resistance means to said positive voltage, second dock diode means comprising an anode and a cathode, said first dock diode anode being connected to said second dock diode anode, second dock lamp means having a very low resistance when unlit connecting said second dock diode cathode to ground, second dock switch means connecting said second dock diode cathode to said positive voltage, transistor means comprising a base, collector and emitter, said transistor emitter being connected to ground, second dock resistance means connecting said transistor collector to a dock bus lead, and third dock resistance means connecting said other end of said first dock resistance means to said transistor base so that when said first dock switch means is closed as a selector switch, said transistor means conducts and said second dock resistance means connects said dock bus lead to ground, said vehicle bus lead and said dock bus lead being connected to a common bus line, whereby when said second vehicle switch means and said first dock switch means are closed, said bus line is placed at a voltage according to said predetermined values of said second vehicle resistance means and said second dock resistance means.

6. The invention as defined in claim 5 further comprising comparator means including comparator amplifier means having first and second inputs and an output, means for applying an alternating voltage to said first and second amplifier inputs, means for applying a reference direct voltage to said first amplifier input, said bus line being connected to said second amplifier input and said predetermined value of said second vehicle resistance means being equal to said predetermined value of said second dock resistance means, whereby an error signal is produced at said amplifier output when the number of said second vehicle resistance means selectively connected to said second amplifier input by the correspondingly closed second vehicle switch means is unequal to the number of said second dock resistance means selectively connected to said second amplifier input by the correspondingly closed first dock switch means controlling the transistor means associated therewith.

* * * * *

UNITED STATES PATENT OFFICE
CERTIFICATE OF CORRECTION

PATENT NO. : 4,045,681

DATED : August 30, 1977

INVENTOR(S) : Roger Boy de la Tour

It is certified that error appears in the above-identified patent and that said Letters Patent are hereby corrected as shown below:

Column 6, line 7, after the figure "108" delete the period (.) and the following three words, "This aircraft select".

Signed and Sealed this

Sixteenth Day of May 1978

[SEAL]

Attest:

RUTH C. MASON
Attesting Officer

LUTRELLE F. PARKER
Acting Commissioner of Patents and Trademarks